United States Patent
Potter et al.

(10) Patent No.: US 7,812,596 B2
(45) Date of Patent: Oct. 12, 2010

(54) TWO-DIMENSIONAL POSITION SENSING SYSTEM

(75) Inventors: Calvin C. Potter, Mesa, AZ (US);
 Casey Hanlon, Queen Creek, AZ (US);
 Paul T. Wingett, Mesa, AZ (US); James I. Kern, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 506 days.

(21) Appl. No.: 11/839,907

(22) Filed: Aug. 16, 2007

(65) Prior Publication Data

US 2009/0045979 A1 Feb. 19, 2009

(51) Int. Cl.
 *G01B 7/14* (2006.01)
(52) U.S. Cl. .............. 324/207.21; 324/207.24
(58) Field of Classification Search .......... None
 See application file for complete search history.

(56) References Cited

U.S. PATENT DOCUMENTS

| | | | |
|---|---|---|---|
| 4,197,855 A | 4/1980 | Lewin | |
| 5,142,225 A | 8/1992 | Gerlach et al. | |
| 5,530,345 A * | 6/1996 | Murari et al. | 324/207.2 |
| 5,909,115 A | 6/1999 | Kano et al. | |
| 5,929,631 A | 7/1999 | Striker et al. | |
| 6,201,466 B1 | 3/2001 | Schroeder | |
| 6,469,927 B2 * | 10/2002 | Spitzer et al. | 365/173 |
| 6,509,732 B1 | 1/2003 | Rhodes et al. | |
| 6,625,517 B1 | 9/2003 | Bogdanov et al. | |
| 6,674,280 B1 | 1/2004 | Goetz et al. | |
| 6,690,159 B2 | 2/2004 | Burreson et al. | |
| 6,731,108 B2 | 5/2004 | Zalunardo et al. | |
| 6,992,479 B2 | 1/2006 | Lequesne et al. | |
| 7,030,604 B1 | 4/2006 | Dmytriw et al. | |
| 7,132,824 B2 | 11/2006 | Masuda et al. | |
| 7,145,326 B2 | 12/2006 | Rhodes et al. | |
| 2004/0017116 A1 * | 1/2004 | Frissen et al. | 310/12 |
| 2007/0063695 A1 | 3/2007 | Ruhrig | |
| 2007/0132464 A1 * | 6/2007 | Desplats et al. | 324/754 |

* cited by examiner

*Primary Examiner*—Jay M Patidar
(74) *Attorney, Agent, or Firm*—Ingrassia Fisher & Lorenz, P.C.

(57) ABSTRACT

A position sensing system includes a plurality of two-axis anisotropic magneto-resistive (AMR) sensors to determine the position of a user interface. A magnetic member is coupled to the user interface, which is movable to a position along a random path. The plurality of two-axis AMR sensors is arranged in a two-dimensional sensor array that is spaced apart from the magnetic member. A signal processor circuit is operable to sense the electrical resistance values of each two-axis AMR sensor, to determine the position of the user interface from the resistance values, and to supply position feedback data representative of the determined position.

14 Claims, 3 Drawing Sheets

TWO-DIMENSIONAL POSITION SENSING SYSTEM

TECHNICAL FIELD

The present invention generally relates to position sensing and, more particularly, to a position sensing system for sensing and determining the position of a device, such as a flight control system user interface, in two-dimensions.

BACKGROUND

User interfaces that are used to translate human movements to machine movements are used in myriad industries. For example, some aircraft flight control systems include a user interface in the form of one or more control sticks, pedals, or other mechanisms. The flight control system, in response to input forces supplied to the user interface(s) from the pilot and/or co-pilot, controls the movements of various aircraft flight control surfaces. No matter the particular end-use system, the user interface preferably includes some type of mechanism to supply haptic feedback, through the user interface, to the user.

Many haptic feedback mechanisms are implemented using a force sensor as the primary input device to the feedback loop. In most instances, the force sensor drives some type of servo amplifier, which in turn drives a motor. The motor, which may be coupled to the user interface via a gearbox, supplies a feedback force to the user interface. Although these types of haptic feedback mechanisms are generally safe and reliable, they do suffer certain drawbacks. For example, the force sensor (or sensors) can increase overall system cost and complexity, and when redundancy is employed to increase overall system reliability, this cost and complexity can be significant.

In addition to increased costs, the force sensor many times senses undesired high frequency vibratory force inputs from the human hand. These force inputs, when sensed, may be amplified, and tuning the feedback loop to reject these vibratory force inputs can adversely impact system characteristics. Moreover, the servo feedback loop can be difficult to tune for acceptable feel because of the high gain associated with a force sensor, and because the motor may be separated from the force sensor by the gearbox. As a result, in some designs additional sensors may be used to sense motor velocity and/or angular acceleration, further adding to costs.

To overcome at least some of the above-noted drawbacks associated with the use of force sensors, some haptic feedback mechanisms use one or more position sensors rather than force sensors. However, presently used position sensors do not overcome all of the potential drawbacks associated with force sensors. Most significantly, high-accuracy position sensors can increase overall system costs. This can be especially true when there is a need to accurately determine user interface displacement in two axes.

Hence, there is a need for a system that can determine the displacement of, for example, a user interface in two axes with relatively high accuracy and at a relatively low cost. The present invention addresses one or more of these needs.

BRIEF SUMMARY

In one embodiment, and by way of example only, a position sensing system includes a magnetic member, a plurality of two-axis anisotropic magneto-resistive (AMR) sensors, and a signal processing circuit. The magnetic member is movable in a direction having a vector component along a first axis and in a direction having a vector component along a second axis that is perpendicular to the first axis. The magnetic member is movable to a position along a random path. The plurality of two-axis AMR sensors is arranged in a two-dimensional sensor array that is spaced apart from the magnetic member. The two-dimensional sensor array includes a plurality of sensor columns and a plurality of sensor rows, in which each sensor column includes a plurality of evenly spaced two-axis AMR sensors extending at least parallel to the first axis, and each sensor row includes a plurality of evenly spaced two-axis AMR sensors extending at least parallel to the second axis. Each two-axis AMR sensor exhibits a first electrical resistance value and a second electrical resistance value. The first and second electrical resistance values are each representative of a displacement between the sensor and the magnetic member. The signal processor circuit is coupled to each of the two-axis AMR sensors and is operable to sense the first and second resistance values of each two-axis AMR sensor, to determine the position of the magnetic member from the first and second resistance values of each two-axis AMR sensor, and to supply position feedback data representative of the determined position.

In another exemplary embodiment, a flight control user interface position sensing and feedback system includes a flight control unit user interface coupled to the above-described position sensing system. The flight control user interface is movable in a direction having a vector component along a first axis and in a direction having a vector component along a second axis that is perpendicular to the first axis. The flight control user interface is movable to a position along a random path.

In yet another exemplary embodiment, a method of self-testing a user interface position sensing system that comprises a plurality of two-axis AMR sensors arranged in a two-dimensional array, and a magnetic member coupled to the user interface, includes sensing user interface position while automatically moving the user interface to a plurality of commanded positions along a predetermined movement path. The sensed user interface positions are compared to the commanded positions.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although the following description may indicate an aircraft as an end-use environment, it will be appreciated that the invention may be used in any one of numerous environments, and with numerous products, in which a user interface may be included.

Figure 1:
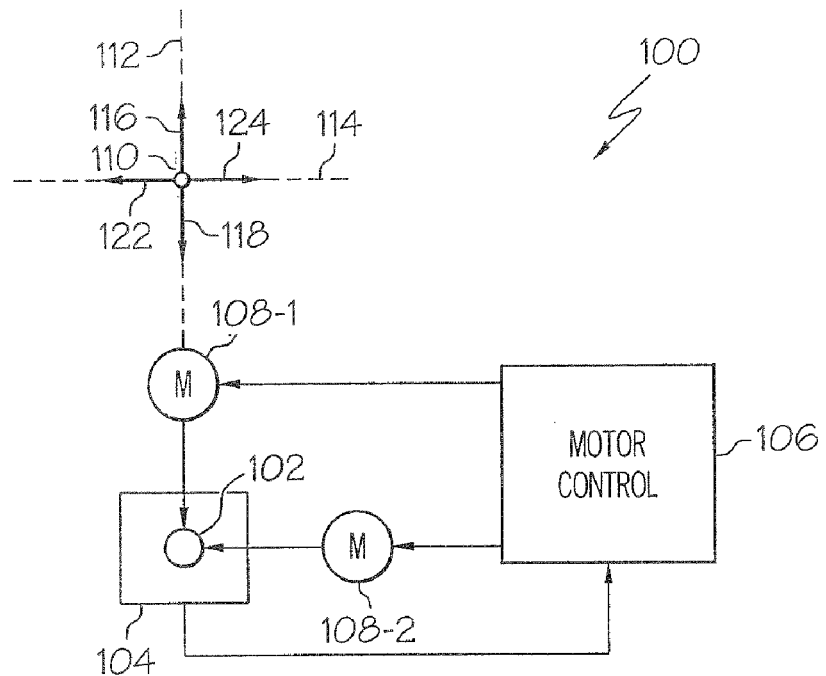
FIG. 1 is a functional block diagram of a user interface system according to an exemplary embodiment of the present invention.

Turning now to FIG. 1, a functional block diagram of a multi-axis user interface system is depicted. The depicted system 100 includes a user interface 102, a position sensing system 104, a motor control 106, and a plurality of motors 108 (e.g. 108-1, 108-2). The user interface 102 is configured to be movable from a null position 110 to any one of numerous control positions, along a random path, and with multiple degrees of freedom. More specifically, the user interface 102 is configured to be movable, from the null position 110, in a direction having a vector component along a first axis 112, and in a direction having a vector component along a second axis 114 that is perpendicular to the first axis. Thus, it may be seen that the user interface 102 is configured to be movable, from the null position 110, in a forward direction 116, an aft direction 118, a port direction 122, a starboard direction 124, a combined forward-port direction, a combined forward-starboard direction, a combined aft-port direction, or a combined aft-starboard direction, and back to, or through, the null position 110.

The position sensing system 104 is coupled to or disposed adjacent the user interface 102. The position sensing system 104, a particular embodiment of which is described in more detail further below, is operable to determine the position of the user interface 102 and supply position feedback data representative of the determined position to the motor control 106. The motor control 106, upon receipt of at least the position feedback data, supplies motor drive signals to one or both of the motors 108-1, 108-2.

The motors 108-1, 108-2, which are each coupled to the user interface 102, are each operable, upon receipt of motor drive signals, to supply a feedback force to the user interface 102. It will be appreciated that, at least in some embodiments, non-illustrated gear sets may be disposed between each motor 108-1, 108-2 and the user interface 102, if needed or desired. It will additionally be appreciated that, at least in some embodiments, the motor drive signals may be variable in magnitude, based on one or more user interface parameters and/or one or more external signals supplied to the motor control 106. These parameters and/or external signals, if included, may vary depending, for example, on the actual end-use environment of the user interface system 100. For example, if the user interface system 100 is used in a flight control system, the parameters may include the position of the user interface 102, the slew rate of the user interface 102, and the external signals may include various aircraft and control surface conditions, and the position of a non-illustrated co-pilot user interface. The user interface, in response to the feedback force supplied from the motors 108-1, 108-2, supplies haptic feedback to a user via the user interface 102. In a particular preferred embodiment, the motors 108-1, 108-2 are implemented as brushless DC motors. It will be appreciated, however, that other types of motors may also be used.

Figure 3:
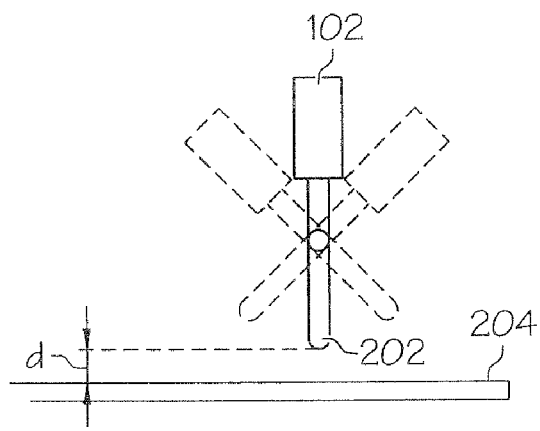
FIGS. 3 and 4 are side and top views, respectively, of portions of the position sensing system of FIG. 2, depicting movement range of a magnetic member over an array of anisotropic magneto-resistive (AMR) sensors.
Figure 4:
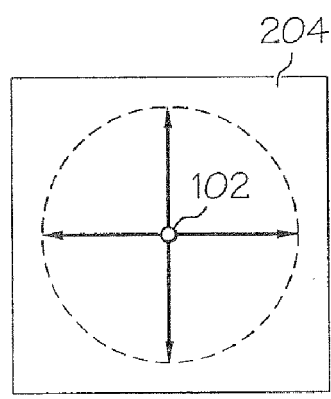
Figure 2:
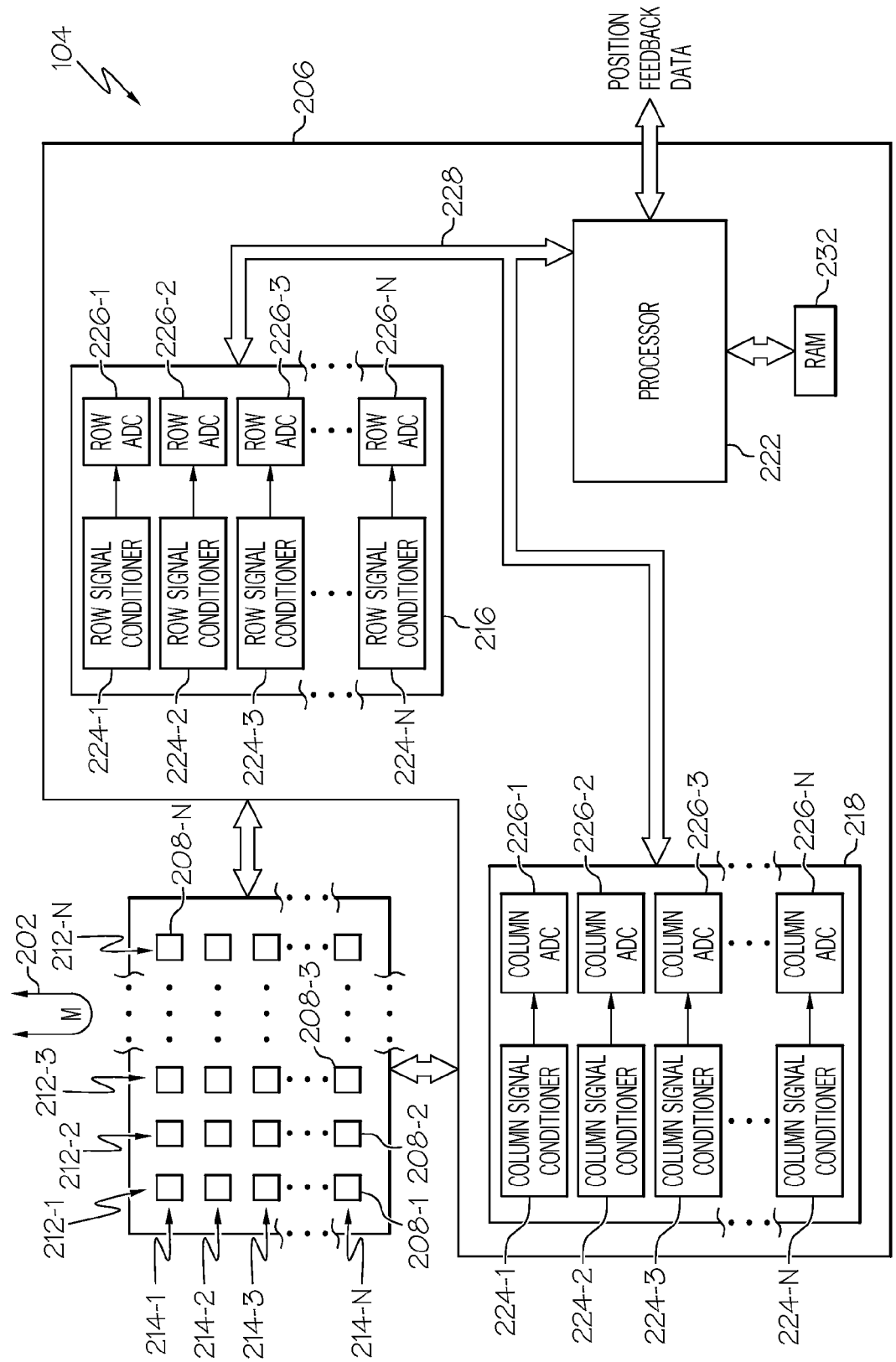
FIG. 2 is a functional block diagram of an exemplary embodiment of a position sensing system that may be used to implement the exemplary user interface system of FIG. 1.

Turning now to FIG. 2, a functional block diagram of an exemplary embodiment of the position sensing system 104 is depicted, and will be described. The position sensing system 104 includes a magnetic member 202, a sensor array 204, and a signal processor circuit 206. The magnetic member 202 is coupled to the user interface 102, and is thus movable therewith. More specifically, as shown more clearly in FIGS. 3 and 4, the magnetic member 202 is coupled to, and extends from, the user interface 102 and is spaced-apart from the sensor array 204 by a distance (d). In the depicted embodiment, in which the user interface 102 is configured to rotate about the first and second axes 112, 114, the magnetic member 202 is movable within a substantially circular sweep range. The sweep range for the depicted embodiment is illustrated in FIG. 4 using dotted lines.

The sensor array 204 is implemented using a plurality of anisotropic magneto-resistive (AMR) sensors 208 (e.g. 208-1, 208-2, 208-3, ... 208-N), and most preferably a plurality of two-axis AMR sensors. The two-axis AMR sensors 208 are arranged in a two-dimensional sensor array that includes a plurality of sensor columns 212 (e.g. 212-1, 212-2, 212-3, ... 212-N) and a plurality of sensor rows 214 (e.g., 214-1, 214-2, 214-3, ... 214-4). It will be appreciated that the number of two axis AMR sensors 208, as well as the number of sensor columns 212 and sensor rows 214, may vary depending, for example, on the sweep range of the magnetic member 202, the desired accuracy, and the desired sensitivity for the position sensing system 104. In any case, each sensor column 212 includes a plurality of evenly spaced two-axis AMR sensors 208 that extend parallel to (or coincident with) the first axis 112, and each sensor row 214 includes a plurality of evenly spaced two-axis AMR sensors 208 that extend parallel to (or coincident with) the second axis 114.

Each two-axis AMR sensor 208 exhibits a first electrical resistance value and a second electrical resistance value. These electrical resistance values vary with, and are each representative of, the displacement between the two-axis AMR sensor 208 and the magnetic member 202. More specifically, it is generally known that an AMR sensor exhibits an electrical resistance that varies with the relative orientation of a magnetic field. In particular, the electrical resistance varies with the angle between a magnetic field vector and the direction of electrical current flow through the sensor. A two-axis AMR sensor 208 typically includes two variable resistance circuits that are each connected in a Wheatstone bridge configuration. One electrical resistance circuit is configured to be sensitive to magnetic field vectors in one direction, and another is configured to be sensitive to magnetic field vectors in another, perpendicular direction. It will thus be appreciated that in the depicted embodiment, each two-axis AMR sensor 208 is oriented such that its first electrical resistance value varies with magnetic field vectors that extend parallel to (or are coincident with) the first axis 112, and its second electrical resistance value varies with magnetic field vectors that extend parallel to (or are coincident with) the second axis 114. Various devices and configurations could be used to implement each of the two-axis AMR sensors 208. One exemplary device is the HMC105X group of magnetic sensors manufactured and sold by Honeywell International, Inc.

No matter the particular device that is used to implement each two-axis AMR sensor 208, each sensor 208 is coupled to the signal processor circuit 206. The signal processor circuit 206 is operable to sense the first and second resistance values of each two-axis AMR sensor 208. This may be done using any one of numerous techniques, but in one particular embodiment the signal processor circuit 206 determines the first and second resistance values of each AMR sensor 208 from sensed voltages. The signal processor circuit 206 is also operable to determine the position of the magnetic member 202, and concomitantly the user interface 102, from the first and second resistance values of each two-axis AMR sensor. The signal processor circuit 206 is additionally operable to supply position feedback data representative of the determined position to one or more external devices.

The signal processor circuit 206 may be implemented using any one of numerous circuit configurations to implement each of the above-described functions. A particular preferred configuration is the one depicted in FIG. 2, and includes a first signal conditioning circuit 216, a second signal conditioning circuit 218, and a processor 222. The first and second signal conditioning circuits 216, 218 are both coupled to each AMR sensor 208. More specifically, the first signal conditioning circuit 216 is coupled to each AMR sensor 208 in a manner that allows the first signal conditioning circuit 218 to supply a signal representative of each AMR sensor's 208 first electrical resistance value, and the second signal conditioning circuit 218 is coupled to each AMR sensor 208 in a manner that allows the second signal conditioning circuit 218 to supply a signal representative of each AMR sensor's 208 second electrical resistance value. To implement this functionality, the first and second signal conditioning circuits 216, 218 each preferably include a plurality of analog signal conditioner circuits 224 (e.g. 224-1, 224-2, 224-3, ..., 224-N) and a plurality of analog-to-digital converters (ADCs) 226 (e.g. 226-1, 226-2, 226-3, ..., 226-N). The analog signal conditioner circuits 224 are each coupled to one of the two-axis AMR sensors 208, and are each operable to supply analog signals representative of either the first or the second resistance value of each two-axis AMR sensor 208. The ADCs 226 are each coupled to, and are operable to sample the analog signals supplied from, one of the analog signal conditioners 224, and are each further operable to supply digital signals representative of the samples to the processor 222. It may thus be appreciated that the number of analog signal conditioner circuits 224 and the number of ADCs 226 are preferably the same as the number of two-axis AMR sensors 208.

It is noted that the analog signal conditioner circuits 224 that form part of the first signal conditioning circuit 216 are referred to herein as row analog signal conditioner circuits, and that the analog signal conditioner circuits 224 that form part of the second signal conditioning circuit 218 are referred to herein as column analog signal conditioner circuits. Thus, as FIG. 2 further depicts, each row analog signal conditioner circuit 224 supplies a signal representative of the first resistance of one of the two-axis AMR sensor 208, and the column analog signal conditioner circuits 224 each supply a signal representative of the second resistance of one of the two-axis AMR sensor 208. In a similar manner, the ADCs 226 that form part of the first signal conditioning circuit 216 are referred to herein as row ADCs, and the ADCs 226 that form part of the second signal conditioning circuit 218 are referred to herein as column ADCs. It may thus be seen that each row ADC 226 is coupled to one of the row analog signal conditioner circuits 224, and each column ADC 226 is coupled to one of the column analog signal conditioner circuits 224.

The processor 222 is coupled to each ADC 226 via, for example, a data bus 228. The processor 222 is configured to control each ADC 226, and to receive the digital signals supplied by each ADC 226. The processor 222, which may be implemented using a general purpose processor or a digital signal processor (DSP), preferably controls the ADCs 226 such that each row ADC 226 and each column ADC 226 each read the associated AMR sensor outputs in parallel and in burst mode. The processor 222, as noted above, determines the first and second electrical resistance values of each two-axis AMR sensor 208 and, from these values, the position of the magnetic member 202. The processor 222 additionally supplies the position feedback data in a serial format, a parallel format, or both, as needed or desired. As FIG. 2 further depicts, random access memory (RAM) 232 may optionally be coupled to the processor 222. If so, the processor 222 is configured to at least selectively supply the position feedback data to the RAM 232.

Figure 5:
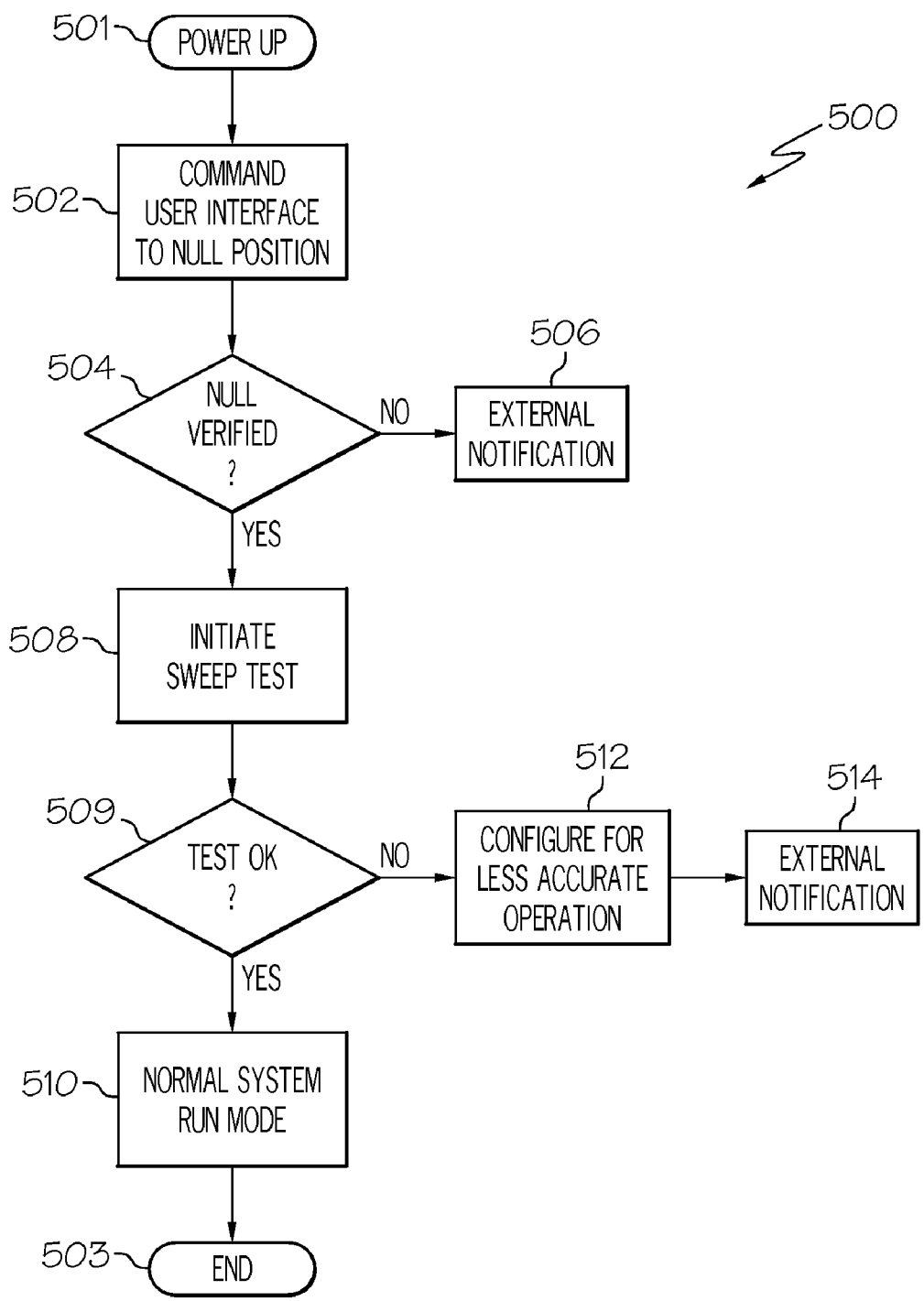
FIG. 5 depicts an exemplary initialization process, in flowchart form, that may be implemented by the user interface system of FIG. 1.

The user interface system 100 configuration depicted in FIGS. 1-4, as delineated above, has an associated user interface null position 110. It will be appreciated that it may be desirable, for example on power-up of the system 100, to verify that the user interface 102 is in the null position 110 and to furthermore initiate a self-test to determine overall system operability. The desirability of this additional functionality may depend on the particular end-use of the user interface system 100. For example, it may be more desirable when the end-use is in an aircraft flight control system. Nonetheless, an exemplary initialization process that may be used is depicted in FIG. 5, and will now be described.

The initialization process 500 preferably begins upon power-up of the system 100 (501), and initially commands the user interface 102 to move to the null position 110 (502). That is, the motor control 106 commands the motors 108 to drive the user interface to the null position 110. The position sensing system 104 then verifies that the user interface 102 is indeed in the null position (504). If the user interface 102 is not in the null position 110, an external notification is supplied to an operator (506). This external notification may be in the form of a visual alert, audible alert, or both. Again, depending upon the particular end-use of the user interface system 100, the system 100 can be further configured to allow a user either to decide not to proceed or to proceed with a relatively less accurate position sensing system 104.

If the user interface 102 is verified to be in the null position 110, the user interface system 100 initiates a user interface sweep test (508, 509). More specifically, the motor control 106 commands the motors 108 to drive the user interface 102 through a predetermined sweep of its movement range. As the user interface 102 is being driven, the sensed positions are compared to the positions being commanded by the motor control 108 to determine the sensed position accuracies. If the sensed positions are sufficiently accurate, then the system 100 initialization process transitions into a normal system run mode (510). Conversely, if one or more sensed positions are not sufficiently accurate, this could indicate that one or more of the two-axis AMR sensors 208 are inoperable or otherwise not operating properly. Depending upon the number of sensors 208 determined to be inoperable or not operating properly, the system 100 could reconfigure itself to operate with less accuracy. For example, the signal processor circuit 206 could determine the position of the user interface 102 from the two-axis AMR sensors 208 adjacent an inoperable two-axis AMR sensor 208. Thus, as FIG. 5 shows, if one or more sensed positions are not sufficiently accurate the system 100 is configured for less accurate operation (512), and an external notification is supplied to an operator (514). This external notification may also be in the form of a visual alert, audible alert, or both.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A position sensing system, comprising:
   a magnetic member movable in a direction having a vector component along a first axis and in a direction having a vector component along a second axis, the second axis perpendicular to the first axis, the magnetic member movable to a position along a random path;
   a plurality of two-axis anisotropic magneto-resistive (AMR) sensors arranged in a two-dimensional sensor array that is spaced apart from the magnetic member, the two-dimensional sensor array comprising a plurality of sensor columns and a plurality of sensor rows, each sensor column comprising a plurality of evenly spaced two-axis AMR sensors extending at least parallel to the first axis, each row comprising a plurality of evenly spaced two-axis AMR sensors extending at least parallel to the second axis, each two-axis AMR sensor exhibiting a first electrical resistance value and a second electrical resistance value, the first and second electrical resistance values each representative of a displacement between the sensor and the magnetic member;
   a signal processor circuit coupled to each of the two-axis AMR sensors, the signal processor circuit operable to (i) sense the first and second resistance values of each two-axis AMR sensor (ii) determine the position of the magnetic member from the first and second resistance values of each two-axis AMR sensor and (iii) supply position feedback data representative of the determined position.

2. The system of claim 1, wherein the signal processor circuit comprises:
   a first signal conditioning circuit coupled to each two-axis AMR sensor and operable to supply signals representative of the first resistance values of each two-axis AMR sensor;
   a second signal conditioning circuit coupled to two-axis AMR each sensor and operable to supply signals representative of the second resistance values of each two-axis AMR sensor; and
   a processor coupled to receive the signals from the first and second signal conditioning circuits and operable, in response thereto, to (i) determine the position of the magnetic member and (ii) supply the position feedback signal.

3. The system of claim 2, wherein the first and second signal conditioning circuits each comprise:
   a plurality of analog signal conditioner circuits, each analog signal conditioner circuit coupled to, and operable to supply analog signals representative of either the first or the second resistance value of, one of the two-axis AMR sensors; and
   a plurality of analog-to-digital converters (ADCs), each ADC coupled to one of the analog signal conditioners and operable to (i) sample the analog signals therefrom and (ii) supply digital signals representative of the samples to the processor.

4. The system of claim 3, wherein:
   the plurality of analog signal conditioner circuits comprises a plurality of row analog signal conditioner circuits and a plurality of column analog signal conditioner circuits, each row analog signal conditioner circuit coupled to one of the two-axis AMR sensors and operable to supply analog signals representative of the first resistance value, each column analog signal conditioner circuit coupled to one of the two-axis AMR sensors and operable to supply analog signals representative of the second resistance value;
   the plurality of ADCs comprises a plurality of row ADCs and a plurality of column ADCs, each row ADC coupled to one of the row analog signal conditioner circuits, each column ADC coupled to one of the column analog signal conditioner circuits.

5. The system of claim 4, wherein the processor controls each ADC such that each row ADC samples the analog signals in parallel, and each column ADC samples the analog signals in parallel.

6. The system of claim 1, wherein the processor is configured to supply the position feedback data in a serial data format.

7. The system of claim 1, further comprising:
   random access memory (RAM) coupled to the processor and configured to at least selectively receive the position feedback data therefrom.

8. A flight control user interface position sensing and feedback system, comprising:
   a flight control user interface movable in a direction having a vector component along a first axis and in a direction having a vector component along a second axis, the second axis perpendicular to the first axis, the flight control user interface movable to a position along a random path;
   a magnetic member coupled to the flight control user interface and movable therewith;
   a plurality of two-axis anisotropic magneto-resistive (AMR) sensors arranged in a two-dimensional sensor array that is spaced apart from the magnetic member, the two-dimensional sensor array comprising a plurality of sensor columns and a plurality of sensor rows, each sensor column comprising a plurality of evenly spaced two-axis AMR sensors extending at least parallel to the first axis, each row comprising a plurality of evenly spaced two-axis AMR sensors extending at least parallel to the second axis, each two-axis AMR sensor exhibiting a first electrical resistance value and a second electrical resistance value, the first and second electrical resistance values each representative of a displacement between the sensor and the magnetic member;
   a signal processor circuit coupled to each of the two-axis AMR sensors, the signal processor circuit operable to (i) sense the first and second resistance values of each two-axis AMR sensor (ii) determine the position of the flight control user interface from the first and second resistance values of each two-axis AMR sensor and (iii) supply a position feedback signal representative of the determined flight control user interface position.

9. The system of claim 8, wherein the signal processor circuit comprises:
   a first signal conditioning circuit coupled to each two-axis AMR sensor and operable to supply signals representative of the first resistance values of each two-axis AMR sensor;
   a second signal conditioning circuit coupled to two-axis AMR each sensor and operable to supply signals representative of the second resistance values of each two-axis AMR sensor; and
   a processor coupled to receive the signals from the first and second signal conditioning circuits and operable, in response thereto, to (i) determine the position of the magnetic member and (ii) supply the position feedback signal.

10. The system of claim 9, wherein the first and second signal conditioning circuits each comprise:
    a plurality of analog signal conditioner circuits, each analog signal conditioner circuit coupled to, and operable to supply analog signals representative of either the first or the second resistance value of, one of the two-axis AMR sensors; and a plurality of analog-to-digital converters (ADCs), each ADC coupled to one of the analog signal conditioners and operable to (i) sample the analog signals therefrom and (ii) supply digital signals representative of the samples to the processor.

11. The system of claim 10, wherein:

the plurality of analog signal conditioner circuits comprises a plurality of row analog signal conditioner circuits and a plurality of column analog signal conditioner circuits, each row analog signal conditioner circuit coupled to one of the two-axis AMR sensors and operable to supply analog signals representative of the first resistance value, each column analog signal conditioner circuit coupled to one of the two-axis AMR sensors and operable to supply analog signals representative of the second resistance value;

the plurality of ADCs comprises a plurality of row ADCs and a plurality of column ADCs, each row ADC coupled to one of the row analog signal conditioner circuits, each column ADC coupled to one of the column analog signal conditioner circuits.

12. The system of claim 11, wherein the processor controls each ADC such that each row ADC samples the analog signals in parallel, and each column ADC samples the analog signals in parallel.

13. The system of claim 8, wherein the processor is configured to supply the position feedback data in a serial data format.

14. The system of claim 8, further comprising:

random access memory (RAM) coupled to the processor and configured to at least selectively receive the position feedback data therefrom.

* * * * *